(12) United States Patent
Barjatia et al.

(10) Patent No.: US 10,024,712 B2
(45) Date of Patent: Jul. 17, 2018

(54) ACOUSTIC PRESENCE DETECTOR

(71) Applicant: Harman International Industries, Incorporated, Stamford, CT (US)

(72) Inventors: Meenakshi Barjatia, Salt Lake City, UT (US); Russell H. Lambert, Highland, UT (US)

(73) Assignee: HARMAN INTERNATIONAL INDUSTRIES, INCORPORATED, Stamford, CT (US)

(*) Notice: Subject to any disclaimer, the term of this patent is extended or adjusted under 35 U.S.C. 154(b) by 0 days.

(21) Appl. No.: 15/133,112

(22) Filed: Apr. 19, 2016

(65) Prior Publication Data
US 2017/0299425 A1   Oct. 19, 2017

(51) Int. Cl.
H04R 3/00 (2006.01)
G01H 7/00 (2006.01)
H04R 29/00 (2006.01)
H04R 3/04 (2006.01)

(52) U.S. Cl.
CPC .............. G01H 7/00 (2013.01); H04R 3/04 (2013.01); H04R 29/001 (2013.01)

(58) Field of Classification Search
CPC .......... G01H 7/00; H04R 3/04; H04R 29/001
See application file for complete search history.

(56) References Cited

U.S. PATENT DOCUMENTS

| | | | |
|---|---|---|---|
| 9,319,633 B1* | 4/2016 | Birkenes | G01S 15/04 |
| 9,472,203 B1* | 10/2016 | Ayrapetian | H04R 3/02 |
| 2004/0161101 A1* | 8/2004 | Yiu | H04M 9/082 379/406.01 |
| 2008/0224863 A1 | 9/2008 | Bachmann | |
| 2008/0240415 A1* | 10/2008 | Mohammad | H04M 9/082 379/406.08 |
| 2010/0278351 A1* | 11/2010 | Fozunbal | H04M 9/082 381/66 |

(Continued)

FOREIGN PATENT DOCUMENTS

| | | |
|---|---|---|
| DE | 3938428 C1 | 4/1991 |
| JP | H07146988 A | 6/1995 |
| JP | 2005071188 A | 3/2005 |

OTHER PUBLICATIONS

Extended European Search Report for EP Application No. 17167009.4 dated Jul. 7, 2017, 7 pages.

*Primary Examiner* — Simon King
(74) *Attorney, Agent, or Firm* — Artegis Law Group, LLP

(57) ABSTRACT

One or more embodiments set forth an audio presence detection system, with a memory that includes an acoustic presence detection application, and a processor that executes the acoustic presence detection application. The audio presence detection system receives a first input signal associated with a first speaker, and receives a second input signal associated with a first microphone. The audio presence detection system generates, via an adaptive filter, a first estimation signal based on at least the first input signal and an impulse response associated with a room related to the first speaker and the first microphone. The audio presence detection system computes a first error signal based on the second input signal and the first estimation signal. The audio presence detection system determines that an object is present within a space based on a magnitude associated with the first error signal relative to a first threshold level.

20 Claims, 6 Drawing Sheets

(56) References Cited

U.S. PATENT DOCUMENTS

| | | | |
|---|---|---|---|
| 2011/0232989 A1* | 9/2011 | Lee | G01S 3/8034 |
| | | | 181/125 |
| 2012/0050049 A1* | 3/2012 | Quinones Caballero | ............... |
| | | | G08B 21/08 |
| | | | 340/573.6 |
| 2016/0363462 A1* | 12/2016 | English | G01D 5/26 |

* cited by examiner

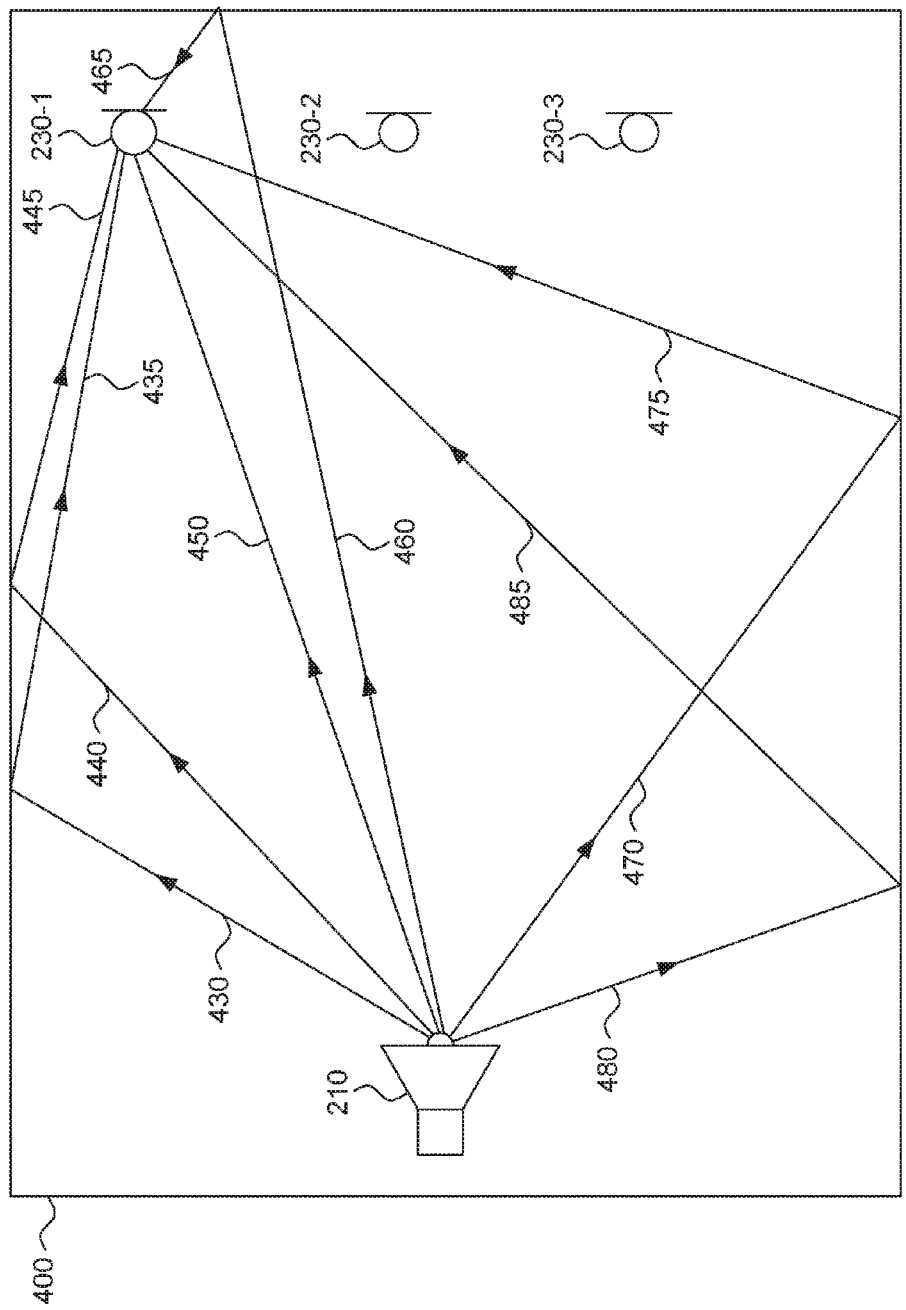

ACOUSTIC PRESENCE DETECTOR

BACKGROUND

Field of the Various Embodiments

Embodiments of the present disclosure relate generally to personal aural devices and, more specifically, to an acoustic presence detector.

Description of the Related Art

Presence detection sensors are oftentimes deployed in various settings or locations, such as private residences, private businesses, and public spaces, to detect the presence of persons in those settings or locations. One common application of presence detection sensors is to detect the presence of intruders or trespassers. In such an application, when the presence detection sensor detects an intruder or trespasser, a signal is typically transmitted to a security system that, in turn, triggers an audible or silent alarm. Another common application of presence detection sensors is in smart home systems, where the presence of a person in a room triggers one or more actions, such as adjusting the lighting, playing music, or opening or closing a set of curtains.

Various types of presence detection sensors currently exist. Infrared (IR) sensors detect changes in infrared energy, typically by sensing thermal energy or via photosensors that are tuned to the infrared frequency range. Motion sensors detect moving objects, typically by sensing changes in an optical or microwave energy field proximate to the motion sensor. Sensor systems based on image processing approaches capture images via a video camera and apply one or more computer vision techniques, such as edge detection or feature matching, to detect the presence of a person. Laser-based systems include one or more laser sources, where each laser source is paired with a different detector. Each of the detectors is configured to transmit a signal when the laser source corresponding to the detector is no longer sensed, such as when the laser beam generated by the laser source has been interrupted by a moving object or person that crosses the path of the laser beam.

One drawback of existing presence detection sensors is that accuracy decreases as a function of distance from the sensor. Therefore, a presence detection sensor may be unable to detect the presence of a person who is beyond a threshold distance from the sensor. Another drawback is that most types of presence detection sensors have "blind spots," where the sensor is unable to detect the presence of a person who is outside of an arc defined by a range of angles relative to the sensor. Similarly, some existing presence detection sensors are unable to detect presence of a person who is behind another object in the room, such as a piece of furniture.

One possible solution to these potential problems is to deploy multiple sensors at different locations in a room. Distributing multiple sensors throughout the room increases the number of areas in the room that are in the proximity of at least one sensor. In addition, certain sensors may be placed in a position to cover certain areas in the room that are not detectable by sensors placed in other areas, thereby reducing the number and size of blind spots. One drawback with these possible solutions is that, even with multiple sensors, total coverage of the room and elimination of blind spots is often difficult, if not impossible. Another drawback with these possible solutions is that increasing the quantity of sensors in a room increases costs, particularly with expensive sensor technologies, such as image processing based systems and laser systems.

As the foregoing illustrates, more effective ways to detect the presence of a person in a setting or location would be useful.

SUMMARY

One or more embodiments set forth include an audio presence detection system. The audio presence detection system includes a memory that includes an acoustic presence detection application, and a processor that is coupled to the memory and, when executing the acoustic presence detection application, is configured to perform certain steps. The steps include receiving a first input signal associated with a first speaker. The steps further include receiving a second input signal associated with a first microphone. The steps further include generating, via an adaptive filter, a first estimation signal based on at least the first input signal and an impulse response associated with a room related to the first speaker and the first microphone. The steps further include computing a first error signal based on the second input signal and the first estimation signal. The steps further include determining that an object is present within a space based on a magnitude associated with the first error signal relative to a first threshold level.

Other embodiments include, without limitation, a computer readable medium including instructions for performing one or more aspects of the disclosed techniques, as well as a method for performing one or more aspects of the disclosed techniques.

At least one advantage of the approach described herein is that the audio presence detection system covers all regions of the room regardless of distance from the audio presence detection system. Another advantage of the disclose approach is that the audio presence detection system exhibits virtually no blind spots, even when deployed with a single microphone and adaptive filter. As a result, the disclosed system exhibits improved presence detection relative to prior approaches.

BRIEF DESCRIPTION OF THE SEVERAL VIEWS OF THE DRAWINGS

So that the manner in which the recited features of the one more embodiments set forth above can be understood in detail, a more particular description of the one or more embodiments, briefly summarized above, may be had by reference to certain specific embodiments, some of which are illustrated in the appended drawings. It is to be noted, however, that the appended drawings illustrate only typical embodiments and are therefore not to be considered limiting of its scope in any manner, for the scope of the disclosed embodiments subsumes other embodiments as well.

FIGS. 4A-4B are conceptual illustrations of how the acoustic presence detection system of FIG. 1 acoustically detects the presence of a person in a room, according to various embodiments.

DETAILED DESCRIPTION

In the following description, numerous specific details are set forth to provide a more thorough understanding of certain specific embodiments. However, it will be apparent to one of skill in the art that other embodiments may be practiced without one or more of these specific details or with additional specific details.

System Overview

Figure 1:
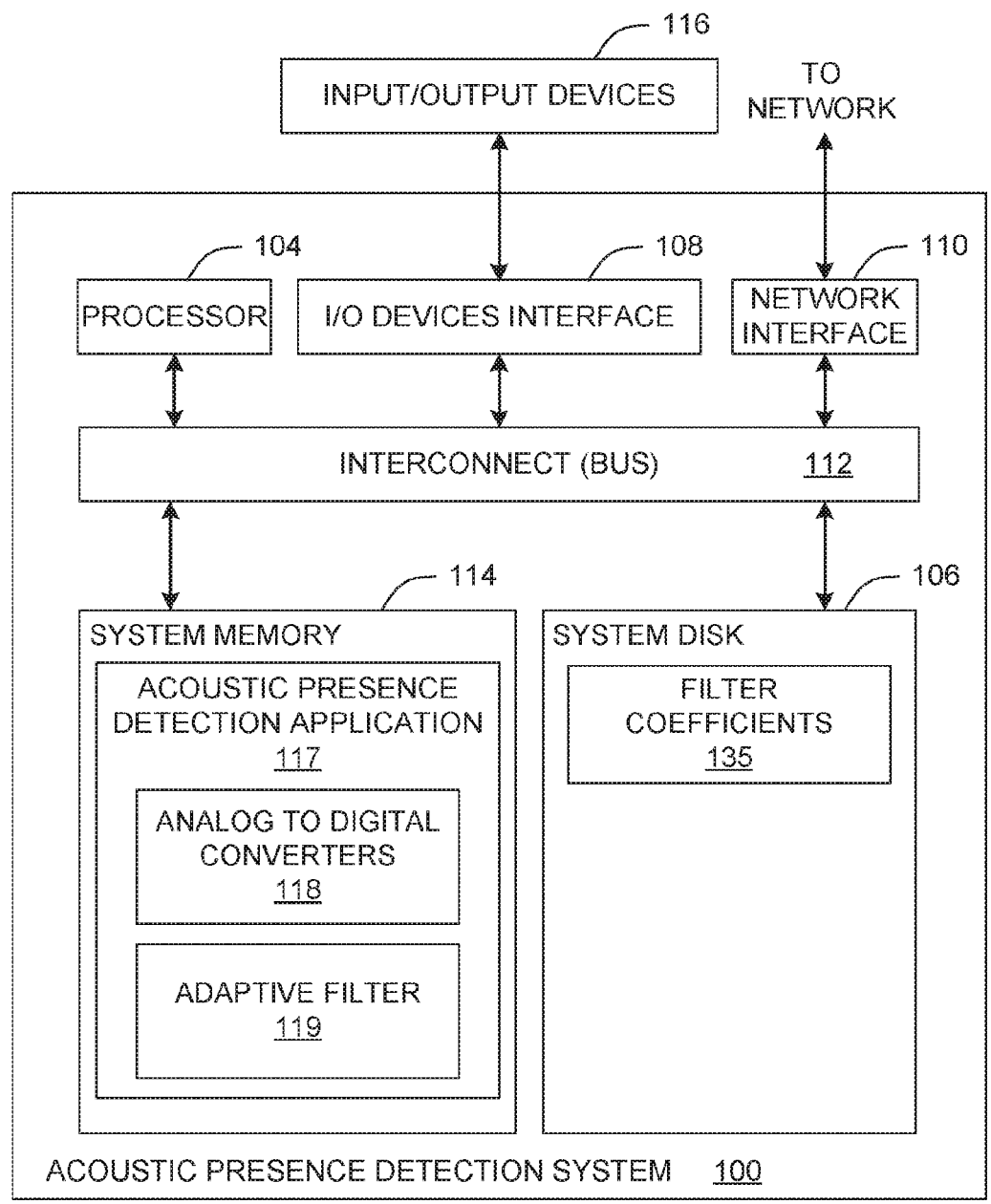
FIG. 1 illustrates an acoustic presence detection processor configured to implement one or more aspects of the various embodiments.

FIG. 1 illustrates an acoustic presence detection system 100 configured to implement one or more aspects of the various embodiments. As shown, acoustic presence detection system 100 includes, without limitation, a processor 104, a system disk 106, an input/output (I/O) devices interface 108, a network interface 110, an interconnect 112, and a system memory 114.

Processor 104 may be any technically feasible form of processing device configured process data and execute program code. Processor 104 could be, for example and without limitation, a central processing unit (CPU), a digital signal processor (DSP), a graphics processing unit (GPU), an application-specific integrated circuit (ASIC), a field-programmable gate array (FPGA), and so forth. Processor 104 includes one or more processing cores. In operation, processor 104 is the master processor of acoustic presence detection system 100, controlling and coordinating operations of other system components. System memory 114 stores software applications and data for use by processor 104. Processor 104 executes software applications stored within system memory 114 and optionally an operating system. In particular, processor 104 executes software and then performs one or more of the functions and operations set forth in the present application.

Similarly, processor 104 is configured to store application data (e.g., software libraries) and retrieve application data from system memory 114. Interconnect 112 is configured to facilitate transmission of data, such as programming instructions and application data, between processor 104, system disk 106, I/O devices interface 108, network interface 110, and system memory 114. I/O devices interface 108 is configured to receive input data from I/O devices 116 and transmit the input data to processor 104 via interconnect 112. I/O devices interface 108 is further configured to receive output data from processor 104 via interconnect 112 and transmit the output data to I/O devices 116. For example, and without limitation, I/O devices 116 may include one or more microphones, one or more speakers, one or more audio signals from a media system, a keyboard, a mouse, and/or other input and output devices.

System memory 114 includes an acoustic presence detection application 117 configured to acoustically detect presence of a person in a space, such as a room. The acoustic presence detection application 217 includes one or more analog to digital converters 118 configured to transform a received analog signal into a digital signal to facilitate analysis and processing by processor 104. In one example, and without limitation, an analog to digital converter 118 could intercept an analog audio signal transmitted by a media system and directed to a speaker. The analog to digital converter 118 could convert the intercepted analog signal into digital form for analysis and processing by adaptive filter 119. In another example, and without limitation, an analog to digital converter 118 could receive an analog audio signal from a microphone. The analog to digital converter 118 could convert the received analog signal into digital form for analysis and processing by adaptive filter 119. The acoustic presence detection application 217 further includes an adaptive filter 119 that adaptively estimates an audio signal received by a microphone based on modifying a source audio signal, such as a signal transmitted to a speaker as modified by the impulse response of the room.

System disk 106 may include one or more hard disk drives, solid state storage devices, or similar storage devices. System disk 106 is configured to store non-volatile data such as filter coefficients 135. Filter coefficients 135 can be retrieved by adaptive filter 119, as further described herein. In some embodiments, network interface 110 is configured to operate in compliance with the Ethernet standard.

Audio Presence Detection

Figure 2:
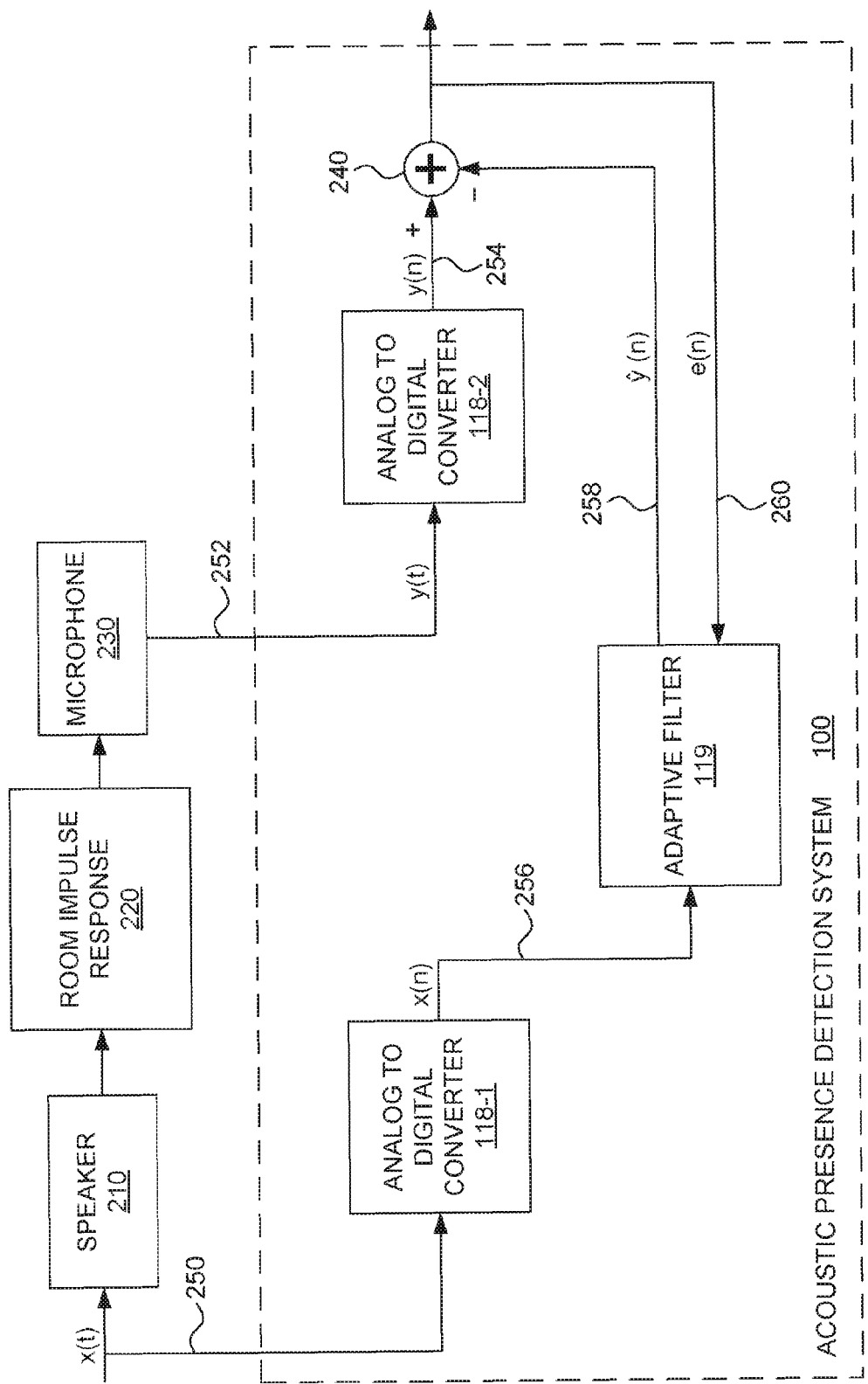
FIG. 2 illustrates how the acoustic presence detection system of FIG. 1 can be implemented within a room to detect the presence of an object, according to various embodiments.

FIG. 2 illustrates how the acoustic presence detection system 100 of FIG. 1 can be implemented within a room to detect the presence of an object, according to various embodiments. As shown, the illustration includes, without limitation, a speaker 210, a room impulse response 220, a microphone 230, and the acoustic presence detection system 100 of FIG. 1.

Speaker 210 receives a signal x(t) 250 representing an analog audio signal from a media system. Signal x(t) 250 may include any suitable audio signal, including, without limitation, music, speech, or a movie soundtrack. Speaker 210 converts signal x(t) 250 into sound waves and transmits the sound waves into the room in which speaker 210 is located. In some embodiments, multiple speakers 210 may be placed into the room.

Room impulse response 220 represents the acoustic response of a space, such as a room, hall, or other area, in which speaker 210 is located. For illustration purposes only, and without limitation, the space is referred to herein as a room. As speaker 210 transmits sound waves into the room in numerous directions, each sound wave strikes one or more surfaces, such as walls, furniture, people and other objects within the room. When a sound wave traveling in a particular direction strikes an object, the sound wave may fully absorbed by the object or may be fully reflected. More typically, when a sound wave traveling in a particular direction strikes an object, some portion of the sound wave is absorbed while some portion of the sound wave is reflected. The reflected portion of the sound wave travels through the room in a different direction with respect to the direction of the original sound wave. The reflected portion may strike another object, where, again, some portion of the sound wave is absorbed while some portion of the sound wave is reflected. This process continues until the acoustic energy of the sound wave strikes an object and is fully absorbed, and little or no portion of the sound wave is reflected. Room impulse response 220 represents the total effect of absorption and reflection of all sound waves emanating from speaker 210.

Microphone 230 is placed within the same room as speaker 210. Microphone 230 receives direct sound waves from speaker 210 as well as reflected sound waves that have reflected off of one or more objects in the room prior to being received by microphone 230. Based on the location of microphone 230 relative to speaker 210 and other objects in the room, a portion of the sound waves from speaker 210 may strike the sensor on the microphone prior to striking another object. Another portion of the sound waves from speaker 210 may strike the sensor on the microphone after striking one or more other objects in the room. The microphone converts the acoustic energy from all of the received sound waves into an analog electrical signal identified as signal y(t) 252. Signal y(t) 252 represents the sound from speaker 210 and received by microphone 230 as modified by room impulse response 220. In some embodiments, the room may include multiple microphones 230 placed in various locations in the room. In such embodiments, each microphone 230 is associated with a different corresponding acoustic presence detection system 100.

Acoustic presence detection system 100 detects when an object, such as a person, has entered the room, exited the room, or moved within the room. In some embodiments, acoustic presence detection system 100 may be a separate physical component from microphone 230. In some embodiments, acoustic presence detection system 100 may be a built into the body of, and included with, microphone 230. In various embodiments, acoustic presence detection system 100 may connect to microphone 230 via a hardwired connection or via a wireless connection such as Bluetooth. As shown in FIG. 2, acoustic presence detection system 100 includes, without limitation, a first analog to digital converter 118-1, a second analog to digital converter 118-2, an adaptive filter 119, and a signal summer 240.

First analog to digital converter 118-1 converts signal x(t) 250, representing an analog audio signal transmitted to speaker 210, into signal x(n) 256, a corresponding digital counterpart to signal x(t) 250. In some embodiments, first analog to digital converter 118-1 receives signal x(t) 250 via a hardwired connection to the source that supplies a signal to speaker 210. In some embodiments, first analog to digital converter 118-1 receives signal x(t) 250 via a wireless connection, such as a Bluetooth connection, to the source that supplies a signal to speaker 210. First analog to digital converter 118-1 samples signal x(t) 250 at a given sampling rate. For example, and without limitation, first analog to digital converter 118-1 could sample signal x(t) 250 at 48 kHz, resulting in a sampling period of 1/48 kHz or approximately 20.83 µs. First analog to digital converter 118-1 transmits signal x(n) 256 to adaptive filter 119.

Likewise, second analog to digital converter 118-2 converts signal y(t) 252, representing an analog audio signal received by microphone 230, into signal y(n) 254, a corresponding digital counterpart to signal y(t) 252. For example, and without limitation, second analog to digital converter 118-2 could sample signal y(t) 250 at 48 kHz, resulting in a sampling period of 1/48 kHz or approximately 20.83 µs. Second analog to digital converter 118-2 transmits signal y(n) 254 to signal summer 240.

Adaptive filter 119 receives signal x(n) 256, the digital version of the signal x(t) 250 representing the analog audio signal transmitted to speaker 210, from first analog to digital converter 118-1. Adaptive filter 119 filters signal x(n) 256 to produce signal $\hat{y}(n)$ 258, an estimate of signal y(n) 254, the digital counterpart of analog signal y(t) 252, received by microphone 230. Adaptive filter 119 transmits signal $\hat{y}(n)$ 258 to signal summer 240. Signal summer 240 subtracts signal $\hat{y}(n)$ 258, the estimate of the signal received by microphone 230, from signal y(n) 254, the digital counterpart of the actual signal received by microphone 230, to generate signal e(n) 260, an error signal. In some embodiments, depending on the latency for generating signal $\hat{y}(n)$ 258, delay signal y(n) 254 may be advantageously delayed prior to calculating the error signal e(n) 260. Such a delay may help to ensure that adaptive filter 119 operates as an estimator rather than a predictor. In one example, and referring to FIG. 2, consider a condition, where the path delay between signal x(t) 250 and signal y(n) 254 would be t1, and the path delay between signal x(t) 250 and signal $\hat{y}(n)$ 258 would be t2. In such cases, if t1<t2, then signal y(n) 254 from analog to digital converter 118-2 could be delayed by an amount represented by t2−t1. This delay would ensure that signal y(n) 254 does not occur earlier than estimation signal $\hat{y}(n)$ 258. Signal summer 240 transmits error signal e(n) 260 to adaptive filter 119. Further, signal summer 240 transmits error signal e(n) 260 as an output. Processor 104 is configured to retrieve the value of error signal e(n) 260 via this output.

Adaptive filter 119 receives error signal e(n) 260 from signal summer 240. Adaptive filter continuously generates signal $\hat{y}(n)$ 258 from signal x(n) 256 according to one or more filter parameters within adaptive filter 119. These filter parameters include, without limitation, the quantity of filter taps in adaptive filter 119 and the filter coefficients 135 associated with the various filter taps. Adaptive filter 119 operates in one of two modes: (1) a training mode; and (2) a detection mode.

In training mode, speaker 210 transmits an appropriate training signal, such as broad spectrum white noise across the audible frequency range or music that includes a broad spectrum of frequencies. Adaptive filter 119 continually adjusts one or more filter parameters within adaptive filter 119 based on the magnitude of error signal e(n) 260. These adjustments of one or more filter parameters include, without limitation, increasing the quantity of taps in a filter, decreasing the quantity of taps in a filter, and adjusting one or more filter coefficients 135 associated with the filter. After each parameter adjustment, adaptive filter 119 measures the new error signal e(n) 260 to determine whether new error signal e(n) 260 has increased or decreased relative to the prior error signal e(n) 260. Adaptive filter 119 continues to make parameter adjustments until error signal e(n) 260 is zero or is within a range of values close to zero. In some embodiments, the allowed range of error signal e(n) 260 may be given as specific absolute values. In some embodiments, the allowed range of error signal e(n) 260 may be given as a percentage, such as no greater than 5% of signal y(n) 254 received from microphone 230. After adaptive filter 119 determines that error signal e(n) 260 is sufficiently close to zero, adaptive filter 119 enters detection mode.

The number of filter taps, and, correspondingly, the number of filter coefficients 135 needed to minimize error signal e(n) 260 varies according to the number and hardness of the object surfaces in the room. In general, as the number of hard surfaces in the room increases, the number of filter taps likewise increases. Correspondingly, the length of adaptive filter 119 in terms of time, as well as the duration of the room impulse response 220, likewise increase with the number of hard surfaces. In one example, and without limitation, a typical room with a mixture of hard and soft surfaces could have a room impulse response 220 of 2-4 seconds in duration. Adaptive filter 119 could minimize error signal e(n) 260 with a 10,000-20,000 tap filter, assuming a "speech quality" sample rate of 8000 Hz. By contrast, room with a large number of hard could have a room impulse response 220 of 8 seconds or more in duration. Adaptive filter 119 could minimize error signal e(n) 260 with filter of 40,000 taps or more.

In some embodiments, the maximum number of taps in adaptive filter 119 may be specified. In such embodiments, adaptive filter 119 may minimize error signal e(n) 260 with the constraint that adaptive filter 119 does not exceed the specified maximum number of taps, while still being sufficiently sensitive to detect when an object enters, exits or moves within the room. By limiting the maximum number of taps in the adaptive filter 119, the training time for the adaptive filter 119 may be reduced relative to allowing the adaptive filter 119 to have an unlimited number of taps. In addition, the needed computing resources may increase with the number of taps, thereby increasing power consumption. By limiting the maximum number of taps in the adaptive filter 119, the computing resources, and, correspondingly, the power consumption, for the adaptive filter 119 may be reduced relative to allowing the adaptive filter 119 to have an unlimited number of taps. The maximum number of filter taps may be any technically feasible number that reduces training time, computing resources, and power consumption while still being sufficiently sensitive to detect when an object enters, exits or moves within the room. The maximum number of filter taps may be, without limitation, 500 taps, 1,000 taps, 2,000 taps, 4,000 taps, or some number greater than 4,000 taps.

Because adaptive filter 119 has access to both the original audio signal x(n) 256 and the resulting audio signal y(n) 254, as modified by the room impulse response 220, adaptive filter 119 can converge more quickly than adaptive filters where the original audio signal is unknown or unavailable. In some embodiments, adaptive filter may be configured to receive only signal y(n) 254 and not the original audio signal x(n) 256. In such embodiments, the training period may be longer relative to an adaptive filter that has access to the original audio signal x(n) 256.

In detection mode, adaptive filter 119 continuously generates signal $\hat{y}(n)$ 258 from signal x(n) 256 according to the filter parameters established during training mode. Signal summer 240 transmits error signal e(n) 260 to adaptive filter 119 and also transmits error signal e(n) 260 as an output. During detection mode, if no sudden changes occur in the room, such an object entering, exiting, or moving within the room, then error signal e(n) 260 remains at or near zero. If an object, such as a person, enters, exits, or moves within the room, then room impulse response 220 changes, because the pattern of how sound waves are absorbed and reflected within the room has changed. As a result, the actual signal y(n) 254 received by microphone 230 is significantly different from estimated signal $\hat{y}(n)$ 258. Correspondingly, error signal e(n) 260 suddenly increases in magnitude above a threshold level, referred to herein as the detection threshold. A receiver of error signal e(n) 260, such as processor 104, detects the sudden increase in magnitude, and, correspondingly, performs one or more appropriate actions or events, including, without limitation, triggering an alarm, adjusting the lighting, playing music, or opening or closing a set of curtains. In some embodiments, the threshold level at which error signal e(n) 260 triggers an action or event may be adjusted. Decreasing the threshold level may increase the sensitivity of adaptive filter 119, whereby an action or event may be triggered even when a small object enters, exits, or moves within the room. Increasing the threshold level may decrease the sensitivity of adaptive filter 119, whereby an action or event may not be triggered when a small object, such as a household pet, enters, exits, or moves within the room. However, an action or event may be triggered when a large object, such as a person, enters, exits, or moves within the room.

Speaker 210 transmits sound waves in an infinite number of directions from the front of speaker 210. As these sound waves strike various objects in the room, reflected waves are transmitted in other directions. These reflected waves strike other objects in the room, resulting in further reflected waves that are transmitted in yet other directions. As this process continues, sound waves reach virtually all areas of the room. As a result, the room impulse response 220, which is the sum total effect of all direct and reflected sound waves in the room, has essentially no blind spots. Therefore, microphone 230 can be placed anywhere within the room, within the scope of the present disclosure. In some embodiments, microphone 230 may advantageously be placed at some distance away from speaker 210 and not in the direct path of speaker 210. In such embodiments, microphone 230 receives a signal that is dominated by reflected sound waves rather than direct sound waves. Correspondingly, adaptive filter 119 may be tuned more to the characteristics of reflected sound waves rather than direct sound waves. As a result, adaptive filter 119 may be more sensitive to changes in the room impulse response 220 leading to improved detection sensitivity.

Over time, the room impulse response 220 may drift due to corresponding changes in certain environmental conditions. In one example, and without limitation, because the speed at which sound waves travel in air varies with temperature, the room impulse response 220 could change as the room temperature increases or decreases. As a result, the actual signal y(n) 254 received by microphone 230 could change while the estimated signal $\hat{y}(n)$ 258 could stay the same. As a result, error signal e(n) 260 would increase even when no object enters, exits, or moves within the room. If error signal e(n) 260 increases sufficiently, a false trigger could be transmitted at the output of adaptive filter 119.

To resolve this issue, adaptive filter may "re-train" periodically, but at a lower rate than during the initial training period. The purpose of such re-training is to maintain the steady-state error signal e(n) below a threshold level, referred to herein as the re-training threshold. In general, the re-training threshold is significantly lower than the detection threshold. That is, the re-training threshold is set at a level to detect slow, small changes in the error signal e(n), indicate drift in the impulse response of the room. By contrast, the detection threshold is set at a level to detect sudden, large changes in the error signal indicating that an object has entered, exited, or moved within the room. For example, and without limitation, adaptive filter could alter the filter coefficients 135 at every sample period during the initial training period. If the audio sampling rate is 48 kHz, then adaptive filter 119 could alter the filter coefficients 135 every $\frac{1}{48}$k seconds or approximately 20.83 μs. After the initial training period terminates and adaptive filter 119 is in detection mode, adaptive filter 119 could enter the training mode to re-train adaptive filter 119 at a lower rate. In a first example, and without limitation, adaptive filter 119 could re-train periodically, such as once every 10 ms. In a second example, and without limitation, adaptive filter 119 could re-train when error signal e(n) 260 gradually increases to a value that exceeds a threshold level. In a third example, and without limitation, these two approaches could be combined, where adaptive filter 119 could re-train when error signal e(n) 260 gradually increases to a value that exceeds a threshold level, but no less often than once every minute. Reducing the frequency of re-training cycles may reduce the needed computational resources and, correspondingly, draw significantly less power relative to more frequent re-training. In addition, because re-training typically involves minor adjustments, re-training cycles generally involve less time than the initial training period.

Figure 3:
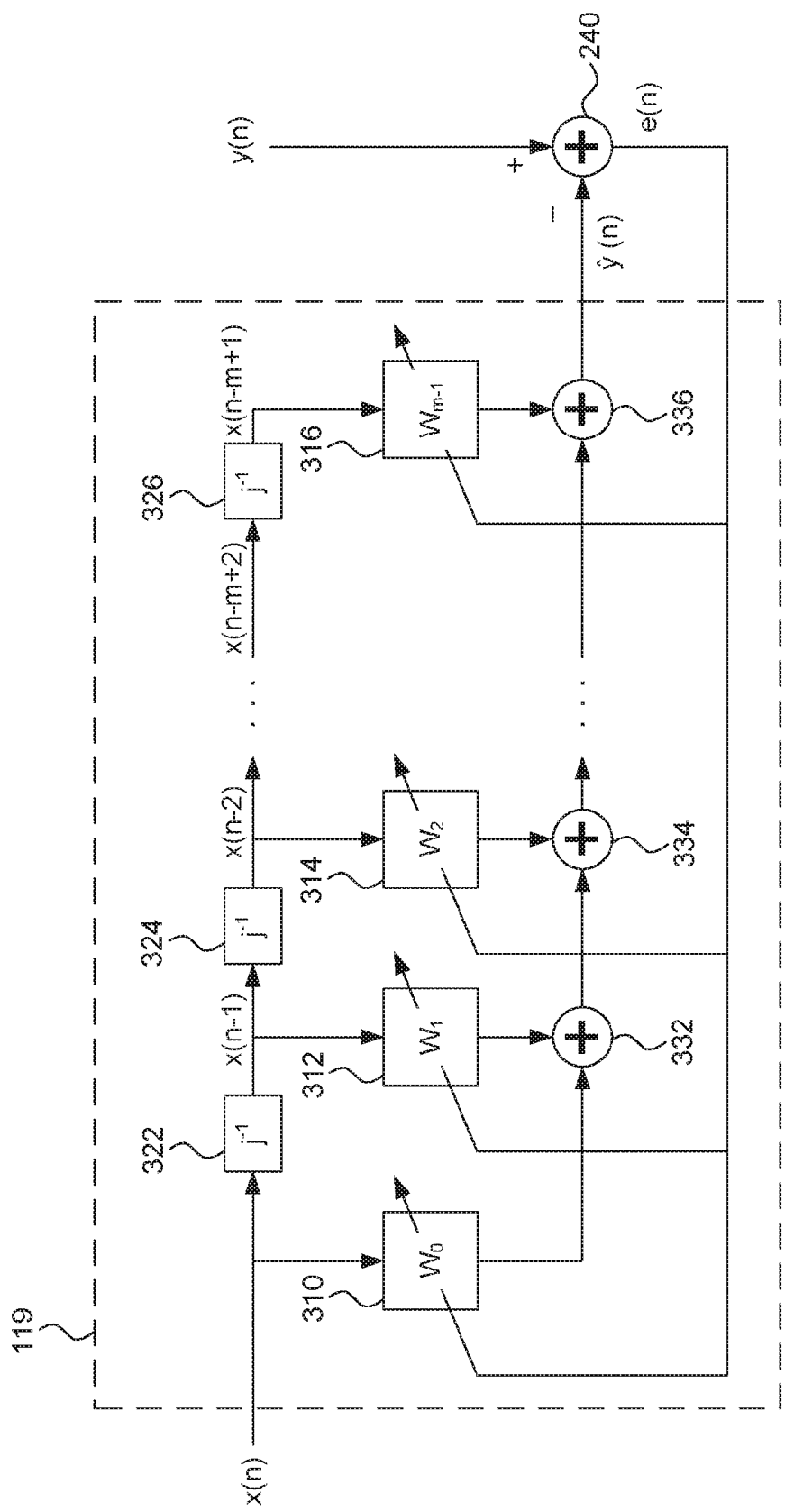
FIG. 3 is a more detailed block diagram of the adaptive filter of FIG. 1, according to various embodiments.

FIG. 3 is a more detailed block diagram of the adaptive filter 119 of FIG. 1, according to various embodiments. As shown, adaptive filter 119 includes delay elements 322, 324, and 326, multipliers 310, 312, 314, and 316, and signal summers 332, 334, and 336.

Multiplier 310 receives signal x(n), the digital counterpart of the signal received by microphone 230, and multiplies signal x(n) by coefficient $W_0$. Delay element 322 delays signal x(n) by one sampling period to generate x(n−1). Multiplier 312 receives signal x(n−1), and multiplies signal x(n−1) by coefficient $W_1$. Signal summer 332 adds the output of multiplier 310 to the output of multiplier 312 and transmits the sum to signal summer 334.

Likewise, delay element 324 delays signal x(n−1) by one sampling period to generate x(n−2). Multiplier 314 receives signal x(n−2), and multiplies signal x(n−2) by coefficient $W_2$. Signal summer 334 adds the output of signal summer 332 to the output of multiplier 314 and transmits the sum to the next signal summer in the chain (not explicitly shown). The process continues for each additional filter coefficient 135 associated with adaptive filter 119. At the final stage of adaptive filter 119, delay element 326 delays signal x(n−m+2) by one sampling period to generate x(n−m+1). Multiplier 314 receives signal x(n−m+1), and multiplies signal x(n−m+1) by coefficient $W_{m-1}$. Signal summer 336 adds the output of the prior signal summer (not explicitly shown) to the output of multiplier 316 and transmits the sum, estimation signal $\hat{\gamma}(n)$, to signal summer 240. Stated mathematically, estimation signal $\hat{\gamma}(n)$ is given by equation 1 below:

$$\hat{\gamma}(n) = (W_0 * x(n)) + (W_1 * x(n-1)) + (W_2 * x(n-2)) + \ldots + (W_{m-1} * x(n-m+1)) \quad (1)$$

Signal summer 240 subtracts signal y(n), the estimate of the signal received by microphone 230, from signal y(n) 254, the digital counterpart of the actual signal received by microphone 230, to generate signal e(n), an error signal. Error signal e(n) is given by equation 2 below:

$$e(n) = y(n) - \hat{\gamma}(n) \quad (2)$$

Error signal e(n) is then transmitted to all multipliers 310, 312, 314, and 316 to adjust coefficients $W_0 \ldots W_{m-1}$. The process repeats for each sampling period until error signal e(n) reaches zero or near zero.

Adaptive filter 119 of FIG. 3 is configured as a transversal, or finite impulse response (FIR), filter architecture employing a least means squares (LMS) adaptation method. However, other technically feasible filter architectures and adaptation methods are possible within the scope of the present disclosure. In various embodiments, adaptive filter 119 may employ other filter architectures including, without limitation, lattice predictor structures and systolic arrays. Likewise, adaptive filter 119 may employ other adaptation methods, including, without limitation, recursive least squares (RLS) adaptation, fast transversal filter (FTF) adaptation, and gradient descent adaptation. In particular, RLS adaptation may have a shorter training period relative to LMS adaptation, but may require more computation, and thus more power, relative to LMS adaptation. In one example, and without limitation, LMS adaptation could need some number of seconds or minutes to train adaptive filter 119 before switching to detection mode. By contrast, RLS adaptation could need only three times the filter length to train adaptive filter 119 before switching to detection mode. Therefore, if the filter is two seconds, then RLS adaptation would need six seconds to train adaptive filter 119 before switching to detection mode. However, RLS adaptation typically needs significantly more computational resources relative to LMS adaptation and, correspondingly, draws significantly more power relative to LMS adaptation, As a result, LMS adaptation would be appropriate in low power applications while RLS adaptation would be more appropriate in applications where a shorter training period is desirable. In some embodiments, an adaptive filter 119 with LMS adaptation may be implemented in either the time domain or the frequency domain. Frequency domain adaptation algorithms may be more efficient as block size is increased, however, updates may only be possible to perform once per block. In general, frequency domain block size may be equal to or greater than the impulse response of the room.

Figure 4B:
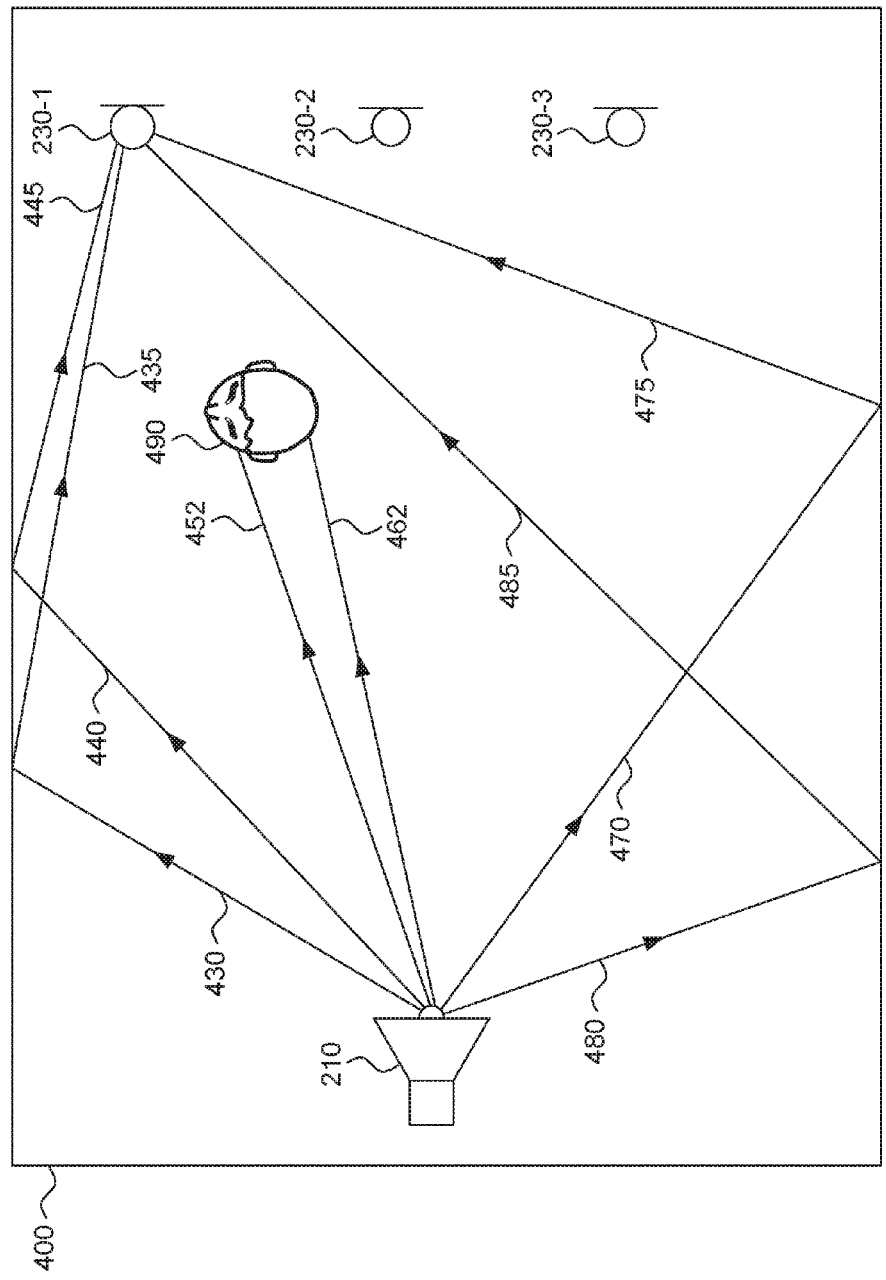

FIGS. 4A-4B are conceptual illustrations of how the acoustic presence detection system 100 of FIG. 1 acoustically detects the presence of a person in a room 400, according to various embodiments. As shown in FIG. 4A, the room 400 includes speaker 210 and three microphones 230-1, 230-2, and 230-3. Each of the three microphones 230-1, 230-2, and 230-3 are fitted with a different acoustic presence detection system 100 as described in conjunction with FIGS. 1-3. Speaker 210 transmits sound waves in a infinite number of directions. For illustration purposes only, six of these sound waves are shown, namely, sound waves 430, 440, 450, 460, 470, and 480. Sound wave 430 strikes a wall, resulting in reflected sound wave 435, which strikes the front portion of microphone 230-1. Likewise, sound wave 440 strikes a wall, resulting in reflected sound wave 445, which also strikes the front portion of microphone 230-1. In similar fashion, sound waves 470 and 480 strike a wall, resulting in reflected sound waves 475 and 485, respectively, which also strike the front portion of microphone 230-1. Sound wave 450 directly strikes the front portion of microphone 230-1 without first striking a wall or other object. Finally, sound wave 460 strikes a wall, resulting in reflected sound wave 465, which strikes the rear portion of microphone 230-1. Analogous sound wave patterns exist for microphones 230-2 and 230-2 (not explicitly shown).

As shown in FIG. 4B, person 490 has now entered the room. Now, the presence of person 490 prevents sound waves 452 and 462, corresponding to sound waves 450 and 460 of FIG. 4A, from reaching microphone 230-1. The presence of person 490 likewise prevents numerous other sound waves from reaching microphone 230-1. In addition, the presence of person 490 changes the path that certain sound waves take when traveling from speaker 210 to microphone 230-1, due to sound waves reflecting off of person 490. As a result, the signal y(n) received by microphone 230-1 changes significantly due to the presence of person 490. However, the estimated signal $\hat{\gamma}(n)$ remains constant, at least until a new training period begins. As a result, the error signal $e(n) = y(n) - \hat{\gamma}(n)$ increases significantly, signifying that an object, such as person 490, has entered, exited, or moved within the room 400.

Although room 400 is fitted with three microphones 230-1, 230-2, and 230-3, room 400 could be fitted with one, two, or more than three microphones 300. Regardless of the number of microphones 230 employed, each microphone 230 is connected to a different acoustic presence detection system 100.

Figure 5:
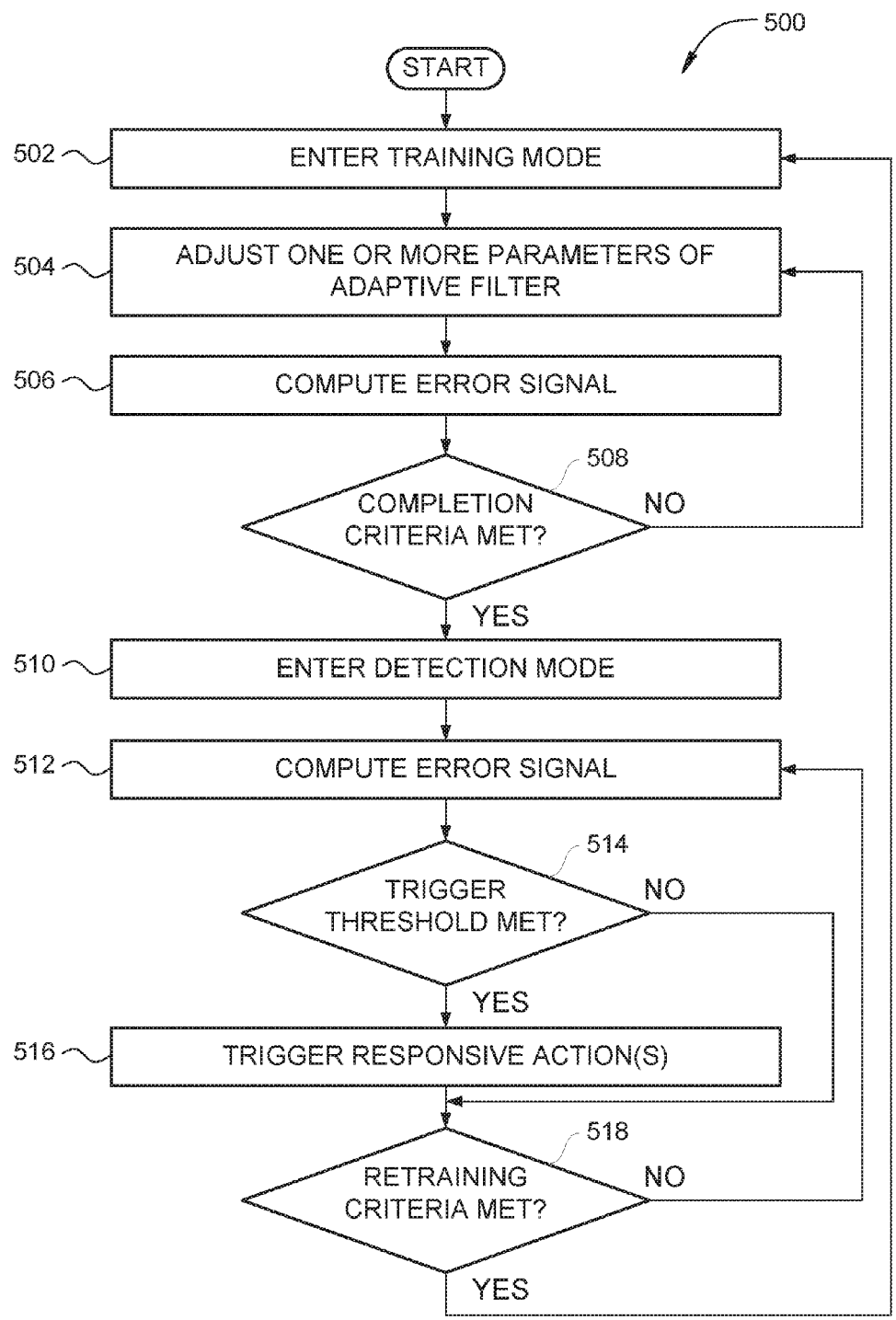
FIG. 5 is a flow diagram of method steps for acoustically detecting presence of a person, according to various embodiments.

FIG. 5 is a flow diagram of method steps for acoustically detecting presence of a person, according to various embodiments. Although the method steps are described in conjunction with the systems of FIGS. 1-4B, persons skilled in the art will understand that any system configured to perform the method steps, in any order, is within the scope of the disclosed embodiments.

As shown, a method 500 begins at step 502, where an acoustic presence detection application 117 executing within an acoustic presence detection system 100 enters a training mode. During the training mode, the acoustic presence detection system 100 performs various steps to minimize an error signal that indicates the difference between the measured impulse response of a room and the estimated impulse response of the room. At step 504, the acoustic presence detection application 117 executing within the acoustic presence detection system 100 adjusts one or more parameters of an adaptive filter 119 within the acoustic presence detection system 100, where the adaptive filter 119 is configured to receive a copy of a signal transmitted to one or more speakers, and estimate a signal representing the input signal as modified by the impulse response of the room. The parameter adjustments may include, without limitation, increasing the number of filter taps, decreasing the number of filter taps, and modifying one or more coefficients related to the filter taps.

At step 506, the adaptive filter 119 within the acoustic presence detection system 100 computes an error signal. To compute the error signal, an analog to digital converter 118-1 within the acoustic presence detection system 100 converts a copy of a signal transmitted to one or more speakers from an analog signal into a digital signal. Likewise, an analog to digital converter 118-2 within the acoustic presence detection system 100 converts a signal received from a microphone from an analog signal into a digital signal. The signal received from the microphone represents the composite of sound waves transmitted by the one or more speakers as modified by the impulse response of the room. The adaptive filter 119 within the acoustic presence detection system 100 applies a digital filter to the digital version of the signal transmitted to one or more speakers, thereby generating an estimation signal that represents an estimate of the digital version of the signal received by the microphone. A signal summer 240 computes the difference between the digital version of the signal received by the microphone and the estimation signal. This difference is the error signal.

At step 508, the acoustic presence detection application 117 executing within the acoustic presence detection system 100 determines whether certain completion criteria are met. In one example, and without limitation, the completion criteria are met when the error signal is zero, near zero, or is below a threshold level. In another example, and without limitation, the completion criteria are met when the adaptive filter 119 contains a specified maximum number of filter taps. If the completion criteria are met, then the method 500 proceeds to step 510, where the acoustic presence detection application 117 executing within the acoustic presence detection system 100 enters a detection mode. In the detection mode, the acoustic presence detection system 100 is configured to detect sudden changes in the error signal, thereby indicating that an object, such as a person, has entered, exited, or moved within the room. In the detection mode, the acoustic presence detection system 100 is further configured to whether and when to reenter the training mode in order to retrain the adaptive filter 119.

At step 512, the adaptive filter 119 within the acoustic presence detection system 100 computes an error signal. The acoustic presence detection system 100 computes the error signal in the manner described in conjunction with step 506. At step 514, the acoustic presence detection application 117 executing within the acoustic presence detection system 100 determines whether a trigger threshold is met. The trigger threshold is set at a level that indicates a sudden large increase in the magnitude of the error signal. A sudden large increase in the magnitude of the error signal indicates that an object, such as a person, has entered, exited, or moved within the room. In some embodiments, the trigger threshold level may be adjusted in order to increase or decrease the sensitivity of the acoustic presence detection system 100. For example, the trigger threshold level could be increased to reduce the sensitivity of the acoustic presence detection system 100. As a result, the entrance, exit, or movement of larger objects, such as person, would result in an error signal that exceeds the trigger threshold level. However, the entrance, exit, or movement of smaller objects, such as a household pet, would not result in an error signal that exceeds the trigger threshold level. Likewise, the trigger threshold level could be decreased to increase the sensitivity of the acoustic presence detection system 100. As a result, the entrance, exit, or movement of larger or smaller objects would result in an error signal that exceeds the trigger threshold level. In any case, small changes in the error signal, such as a change caused by drift of the room impulse response due to temperature or other environmental changes, would not result in an error signal that exceeds the trigger threshold level.

If the trigger threshold is met, then the method 500 proceeds to step 516, where the the acoustic presence detection application 117 executing within the acoustic presence detection system 100 triggers one or more appropriate responsive actions. If the audio presence detection system 100 is part of a security system, then the audio presence detection system triggers an alarm. If the audio presence detection system 100 is part of a smart home system, then the acoustic presence detection application 117 executing within the acoustic presence detection system 100 triggers some other responsive action, such as adjusting the lighting, playing music, or opening or closing a set of curtains.

At step 518, the acoustic presence detection application 117 executing within the acoustic presence detection system 100 determines whether certain retraining criteria are met. In one example, and without limitation, the retraining criteria are met when the error signal exceeds a retraining threshold level. In general, the retraining threshold level is set to a value that is significantly lower than the trigger threshold level. In another example, and without limitation, the retraining criteria are met when a fixed duration of time has passed since last entering the training mode. In yet another example, and without limitation, the retraining criteria are met, when either the error signal exceeds a retraining threshold level or the time since the training mode was entered exceeds a fixed duration of time. If the retraining criteria are not met, then the method 500 proceeds to step 512, described above. If, however, at step 518, certain retraining criteria are met, then the method 500 proceeds to step 502, described above.

Returning to step 514, if the trigger threshold is not met, then the method 500 proceeds to step 518, described above.

Returning to step 508, if certain completion criteria are not met, then the method 500 proceeds to step 504, described above.

In sum, an audio presence detection system includes one or more speakers located in a room plays music or some other audio source. The audio presence detection system includes a microphone, also located in the room, receives the audio signal emanating from the speakers as modified by the impulse response of the room. The audio presence detection system further includes an adaptive filter receives a copy of the source audio signal that is driving the one or more speakers. The adaptive filter generates an estimation signal that predicts the signal received by the microphone. The estimation signal is generated by transforming the source audio signal via a particular filtering technique. The adaptive filter also receives an error signal that tracks the difference between the signal received by the microphone and the estimation signal. The adaptive filter adjusts until the error signal is at or near zero.

Once this condition is achieved, the adaptive filter continues to monitor the error signal. The detection of a sudden increase in the magnitude of the error signal indicates a sudden change in the impulse response of the room. This sudden change in the impulse response of the room indicates that an object, such as a person, has entered the room, exited the room, or moved within the room. In response, the audio presence detection system takes an appropriate responsive action. If the audio presence detection system is part of a security system, then the audio presence detection system triggers an alarm. If the audio presence detection system is part of a smart home system, then the audio presence detection system triggers some other responsive action, such as adjusting the lighting, playing music, or opening or closing a set of curtains.

At least one advantage of the approach described herein is that the audio presence detection system covers all regions of the room regardless of distance from the audio presence detection system. Another advantage of the disclose approach is that the audio presence detection system exhibits virtually no blind spots, even when deployed with a single microphone and adaptive filter. Because the disclosed system does not depend on proximity to the sensor and does not result in undetectable blind spots, the disclosed system exhibits improved presence detection relative to prior approaches. Another advantage of the approach described herein is that, even when deployed with a single microphone and adaptive filter, the disclosed system exhibits improved performance relative to prior approach systems that include multiple sensors. As a result, superior performance may be achieved at a lower cost that previously achievable.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for acoustically detecting the presence of objects within a space, the method comprising:
receiving a first input signal associated with a first speaker;
receiving a second input signal associated with a first microphone;
generating, via an adaptive filter, a first estimation signal based on the first input signal and one or more parameters associated with the adaptive filter;

computing a first error signal based on the second input signal and the first estimation signal;
determining that an object is present within the space based on a magnitude associated with the first error signal relative to a first threshold level;
determining that a condition has been met based on the magnitude associated with the first error signal relative to a second threshold level, the condition indicating that the adaptive filter should be trained; and
in response, performing one or more operations to train the adaptive filter.

2. The computer-implemented method of claim 1, further comprising performing one or more operations to train the adaptive filter in order to maintain the first error signal below the second threshold level.

3. The computer-implemented method of claim 2, wherein the one or more operations comprise:
adjusting at least one parameter included in the one or more parameters;
generating a second estimation signal based on the first input signal and the at least one parameter that has been adjusted;
computing a second error signal based on the second input signal and the second estimation signal; and
determining that the second error signal is below the second threshold level.

4. The computer-implemented method of claim 1, wherein the space comprises a room that is associated with the first microphone and the first speaker, and the second input signal is associated with the first input signal and an impulse response of the room.

5. The computer-implemented method of claim 4, wherein the second input signal is associated with a first audio wave transmitted by the first speaker and reflected by at least one surface associated with the room.

6. The computer-implemented method of claim 1, wherein the space comprises a room, and the magnitude of the first error signal indicates a change in an impulse response of the room attributable to the object being present within the room.

7. The computer-implemented method of claim 1, further comprising, in response to determining that the object is present within the space, triggering a security alarm, adjusting a lighting condition, playing an audio source, or adjusting a set of curtains.

8. The computer-implemented method of claim 1, wherein the first input signal comprises a digital audio signal corresponding to an analog audio signal transmitted to the first speaker.

9. The computer-implemented method of claim 1, wherein determining that a condition has been met comprises determining that the magnitude associated with the first error signal indicates at least one change in an environmental condition within the space.

10. A non-transitory computer-readable storage medium including instructions that, when executed by a processor, configure the processor to perform the steps of:
receiving a first input signal associated with a first speaker;
receiving a second input signal associated with a first microphone;
generating, via an adaptive filter comprising a plurality of filter taps, a first estimation signal based on the first input signal and one or more parameters associated with the adaptive filter;
computing a first error signal based on the second input signal and the first estimation signal;
determining that an object is present within a space based on a magnitude associated with the first error signal relative to a first threshold level;
determining that a condition has been met based on the magnitude associated with the first error signal relative to a second threshold level, the condition indicating that the adaptive filter should be trained; and
in response, performing one or more operations to train the adaptive filter.

11. The non-transitory computer-readable storage medium of claim 10, further comprising performing one or more operations to train the adaptive filter in order to maintain the first error signal below the second threshold level.

12. The non-transitory computer-readable storage medium of claim 11, wherein the one or more operations comprise:
adjusting at least one parameter included in the one or more parameters;
generating a second estimation signal based on the first input signal and the at least one parameter that has been adjusted;
computing a second error signal based on the second input signal and the second estimation signal; and
determining that the second error signal is below the second threshold level.

13. The non-transitory computer-readable storage medium of claim 10, further comprising determining that a condition has been met that indicates that the adaptive filter should be trained, and performing one or more operations to train the adaptive filter.

14. The non-transitory computer-readable storage medium of claim 10, wherein the space comprises a room that is associated with the first microphone and the first speaker, and the second input signal is associated with the first input signal and an impulse response of the room.

15. The non-transitory computer-readable storage medium of claim 10, wherein the first threshold level is expressed as an absolute value or as a percentage of the first input signal.

16. A computing device, comprising:
a memory that includes an acoustic presence detection application; and
a processor that is coupled to the memory and, when executing the acoustic presence detection application, is configured to:
receive a first input signal associated with a first speaker;
receive a second input signal associated with a first microphone;
generate, via an adaptive filter, a first estimation signal based on at least the first input signal and an impulse response associated with a room related to the first speaker and the first microphone;
compute a first error signal based on the second input signal and the first estimation signal;
determine that an object is present within a space based on a magnitude associated with the first error signal relative to a first threshold level;
determine that a condition has been met based on the magnitude associated with the first error signal relative to a second threshold level, the condition indicating that the adaptive filter should be trained; and
in response, perform one or more operations to train the adaptive filter.

17. The computing device of claim 16, wherein the adaptive filter comprises, at least in part, at least one of a finite impulse response (FIR) filter, a lattice predictor structure, and a systolic array.

18. The computing device of claim 16, wherein the adaptive filter employs at least one of least means squares (LMS) adaptation, recursive least squares (RLS) filtering, fast transversal filter (FTF) adaptation, and gradient descent adaptation.

19. The computing device of claim 16, wherein the first microphone is placed in a location that is not in the direct path of sound waves transmitted by the first speaker.

20. The computing device of claim 16, wherein the computing device and the first microphone are embedded within a single physical enclosure.

* * * * *